United States Patent
Yasukawa et al.

(10) Patent No.: US 7,219,192 B2
(45) Date of Patent: May 15, 2007

(54) STORAGE SYSTEM AND METHOD FOR A STORAGE CONTROL APPARATUS USING INFORMATION ON MANAGEMENT OF STORAGE RESOURCES

(75) Inventors: Hironori Yasukawa, Odawara (JP); Akinobu Shimada, Chigasaki (JP); Kozue Fujii, Odawara (JP); Tatsuya Murakami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 191 days.

(21) Appl. No.: 10/765,883

(22) Filed: Jan. 29, 2004

(65) Prior Publication Data

US 2005/0120171 A1    Jun. 2, 2005

(30) Foreign Application Priority Data

Nov. 28, 2003    (JP)    ............................. 2003-400515

(51) Int. Cl.
*G06F 12/00*    (2006.01)
(52) U.S. Cl. ................... 711/112; 711/111; 711/113; 711/114; 711/170; 711/173; 709/213
(58) Field of Classification Search ................ 711/111, 711/112, 113, 114, 173; 709/213
See application file for complete search history.

(56) References Cited

U.S. PATENT DOCUMENTS

| | | | |
|---|---|---|---|
| 4,467,421 A | | 8/1984 | White |
| 5,210,844 A | | 5/1993 | Shimura et al. |
| 5,537,534 A | * | 7/1996 | Voigt et al. ..................... 714/6 |
| 5,960,451 A | * | 9/1999 | Voigt et al. .................. 711/114 |
| 6,014,730 A | | 1/2000 | Ohtsu |
| 6,260,120 B1 | * | 7/2001 | Blumenau et al. .......... 711/152 |

(Continued)

FOREIGN PATENT DOCUMENTS

EP    1237088    8/2002

(Continued)

OTHER PUBLICATIONS

Peter Zabback et al., "The RAID Configuration Tool", Dec. 19-22, 1996, 3rd International Conference on High Performance Computing, Proceedings, pp. 55-61.*

(Continued)

*Primary Examiner*—Hong Kim
*Assistant Examiner*—Arpan Savla
(74) *Attorney, Agent, or Firm*—Mattingly, Stanger, Malur & Brundidge, P.C.

(57) ABSTRACT

A storage control apparatus comprises a data I/O control unit which has communication ports adapted to connect with any of information processing apparatuses, is communicatively connected to physical disk drives for storing data, and performs data read/write from/to the drives according to a data I/O request received from the processing apparatus; a first memory storing a data read/written among the data stored in the disk drives; and a second memory storing information on management of storage resources including the communication ports, the physical disk drives, and a storage capacity of the first memory allocated for each user using the processing apparatuses. Upon reception of a request of the information on management from a user, an identifier of the communication port, an identifier of the disk drive, and a storage capacity of the first memory allocated for the user are transmitted to a user interface.

11 Claims, 16 Drawing Sheets

U.S. PATENT DOCUMENTS

| | | |
|---|---|---|
| 6,385,681 B1 | 5/2002 | Fujimoto et al. |
| 6,421,711 B1 | 7/2002 | Blumenau et al. |
| 6,480,932 B1 | 11/2002 | Vallis et al. |
| 7,024,517 B1* | 4/2006 | Zahavi ................ 711/114 |
| 2002/0010843 A1 | 1/2002 | Sanada et al. |
| 2002/0133669 A1 | 9/2002 | Devireddy et al. |
| 2002/0156984 A1 | 10/2002 | Padovano |
| 2003/0093501 A1* | 5/2003 | Carlson et al. ............ 709/220 |
| 2004/0123068 A1 | 6/2004 | Hashimoto |
| 2005/0050268 A1 | 3/2005 | Yoshida |

FOREIGN PATENT DOCUMENTS

| | | |
|---|---|---|
| EP | 1357476 | 10/2003 |
| WO | 0195113 | 12/2001 |

OTHER PUBLICATIONS

JP-A-5-128002.

H. Yoshida, "LUN Security Considerations for Storage Area Networks", pp. 1-7.

* cited by examiner

162A  PHYSICAL DISK MANAGEMENT TABLE

| DISK NUMBER | CAPACITY | RAID | USE STATE | ECC GROUP |
|---|---|---|---|---|
| #001 | 100GB | 5 | IN USE | 0 |
| #002 | 100GB | 5 | IN USE | 0 |
| #003 | 100GB | 5 | IN USE | 0 |
| #004 | 100GB | 5 | IN USE | 0 |
| #005 | 100GB | 5 | IN USE | 0 |
| #006 | 50GB | – | NOT USED | 1 |
| ⋮ | ⋮ | ⋮ | ⋮ | ⋮ |

162B

LU MANAGEMENT TABLE

| LU NUMBER | PHYSICAL DISK | CAPACITY | RAID | CLPR |
|---|---|---|---|---|
| #1 | #001,#002,#003,#004,#005 | 100GB | 5 | 0 |
| #2 | #001,#002,#003,#004,#005 | 300GB | 5 | 0 |
| #3 | #006,#007, | 200GB | 1 | 1 |
| ⋮ | ⋮ | ⋮ | ⋮ | ⋮ |

CLPR MANAGEMENT TABLE

| IDENTIFIER | CACHE CAPACITY | ECC Group | SLPR IDENTIFIER |
|---|---|---|---|
| CLPR0 | 100GB | GRP0 | SLPR0 |
| CLPR1 | 100GB | GRP1 | SLPR1 |
| CLPR2 | 100GB | GRP2 | SLPR1 |
| CLPR3 | 100GB | GRP3 | SLPR2 |

SLPR MANAGEMENT TABLE

| IDENTIFIER | USABLE CU NUMBER | USABLE SSID |
|---|---|---|
| SLPR0 | CU 0 × 01 | 4, 5 |
| SLPR1 | CU 0 × 00 | 6, 7 |
| SLPR2 | CU 0 × 02 | 8 |
| SLPR3 | CU 0 × 03<br>CU 0 × 04 | 9, 10, 11 |

FIG. 15

PORT MANAGEMENT TABLE 162H

| PORT NUMBER | SLPR IDENTIFIER |
|---|---|
| 0 | SLPR0 |
| 1 | SLPR1 |
| ... | |

FIG. 16

USER MANAGEMENT TABLE 162D

| USER ID | USER NAME | PASSWORD | REMARKS |
|---|---|---|---|
| 000Z | root | xxx | STORAGE ADMINISTRATOR |
| 123A | User_A | xxx | COMPANY A |
| 456B | User_B | xxx | COMPANY B |
| 789C | User_C | xxx | COMPANY C |
| ⋮ | ⋮ | ⋮ | ⋮ |

FIG. 17

COUNTER-USER TABLE 162E

| USER NAME | SLPR |
|---|---|
| STORAGE ADMINISTRATOR | ALL |
| User_A | SLPR0 |
| User_B | SLPR1 |
| User_C | SLPR2 |
| ⋮ | ⋮ |

FIG. 21

DIVISION DEFINITION SCREEN

| SLPR | CU | SSID |
|---|---|---|
| 0 | 01 | 4,5 |
| 1 | 00 | 6,7 |
| 2 | 02 | 8 |
| 3 | 03,04 | 9,10,11 |

| PORT | SLPR |
|---|---|
| 0 | 0 |
| 1 | 1 |
| 2 | 2 |
| 3 | 2 |

| LU | SLPR |
|---|---|
| 1 | 0 |
| 2 | 0 |
| 3 | 1 |

| CLPR | CACHE CAPACITY | ECC GROUP | SLPR |
|---|---|---|---|
| 0 | 100GB | 0 | 0 |
| 1 | 100GB | 1 | 1 |
| 2 | 100GB | 2 | 1 |
| 3 | 100GB | 3 | 2 |

Cancel  OK

FIG. 23

CONFIGURATION INFORMATION SCREEN 0

| SLPR0 | |
|---|---|
| CU | 01 |
| SSID | 4.5 |
| PORT NUMBER | 0 |
| CACHE CAPACITY | 100GB |
| ECC GROUP | 0 |

OK

Cancel

STORAGE SYSTEM AND METHOD FOR A STORAGE CONTROL APPARATUS USING INFORMATION ON MANAGEMENT OF STORAGE RESOURCES

CROSS-REFERENCE TO RELATED APPLICATION

Japanese Patent Application No. 2003-400515 applied on Nov. 28, 2003 in Japan is cited to support the present invention.

BACKGROUND OF THE INVENTION

The present invention relates to a storage control apparatus and a control method thereof.

With recent progress of information technique, storage consolidation is performed so that a storage device is shared by a plurality of users. In the storage consolidation, each user uses the storage device by using storage resources such as a hard disk drive and a communication port allocated to him/her. In this case, various settings for using the storage resources should be performed by a system administrator of each user for the storage resources allocated for him/her. For example, see JP-A-5-128002.

SUMMARY OF THE INVENTION

However, in the conventional storage device, when the system administrator instructs to transmit storage device configuration information to the storage device, there is a case that configuration information including storage resources allocated for another user is transmitted.

For this, each system administrator must pay attention so that the storage device is used within the range of the storage resource allocated for him/her when performing various settings of the storage device. Moreover, the administrator should pay attention so that no erroneous setting will affect the storage resources of other users. This increases the load of system administration. The load is expected to be reduced.

It is therefore an object of the present invention to provide a storage control apparatus and a control method thereof which can solve the prior art problem mentioned above.

In order to achieve the aforementioned object, the present invention provides a storage control apparatus comprising: a data I/O control section which includes a plurality of communication ports that can be communicatively connected with any of a plurality of information processing apparatuses, is communicatively connected to a plurality of physical disk drives storing data, receives a data I/O request for the data stored in the physical disk drives from the information processing apparatuses via the communication ports, and performs data read/write from/to the physical disk drives in accordance with the data I/O request; a first memory storing data which is read/written among the data stored in the physical disk drives; and a second memory storing information on management of storage resources including the communication ports, the physical disk drives, and a storage capacity of the first memory allocated for each user using the information processing apparatuses; wherein upon reception of a transmission request of the information on management of the storage resource from a user via a user interface, an identifier of the communication port, an identifier of the physical disk drive, and a storage capacity of the first memory which have been allocated for the user are transmitted to the user interface.

Other objects and solutions therefor disclosed in the present application will become clear from the preferable embodiments of the present invention taken in conjunction with the accompanying drawings.

BRIEF DESCRIPTION OF THE DRAWINGS

FIG. 15 shows a port management table according to the present embodiment.

FIG. 16 shows a user management table according to the present embodiment.

FIG. 17 shows a user-SLPR relation table according to the present embodiment.

FIG. 21 shows a partition definition screen according to the present embodiment.

FIG. 23 shows a configuration information screen according to the present embodiment.

DETAILED DESCRIPTION OF THE EMBODIMENTS

[Outline Of Configuration]

Figure 1:
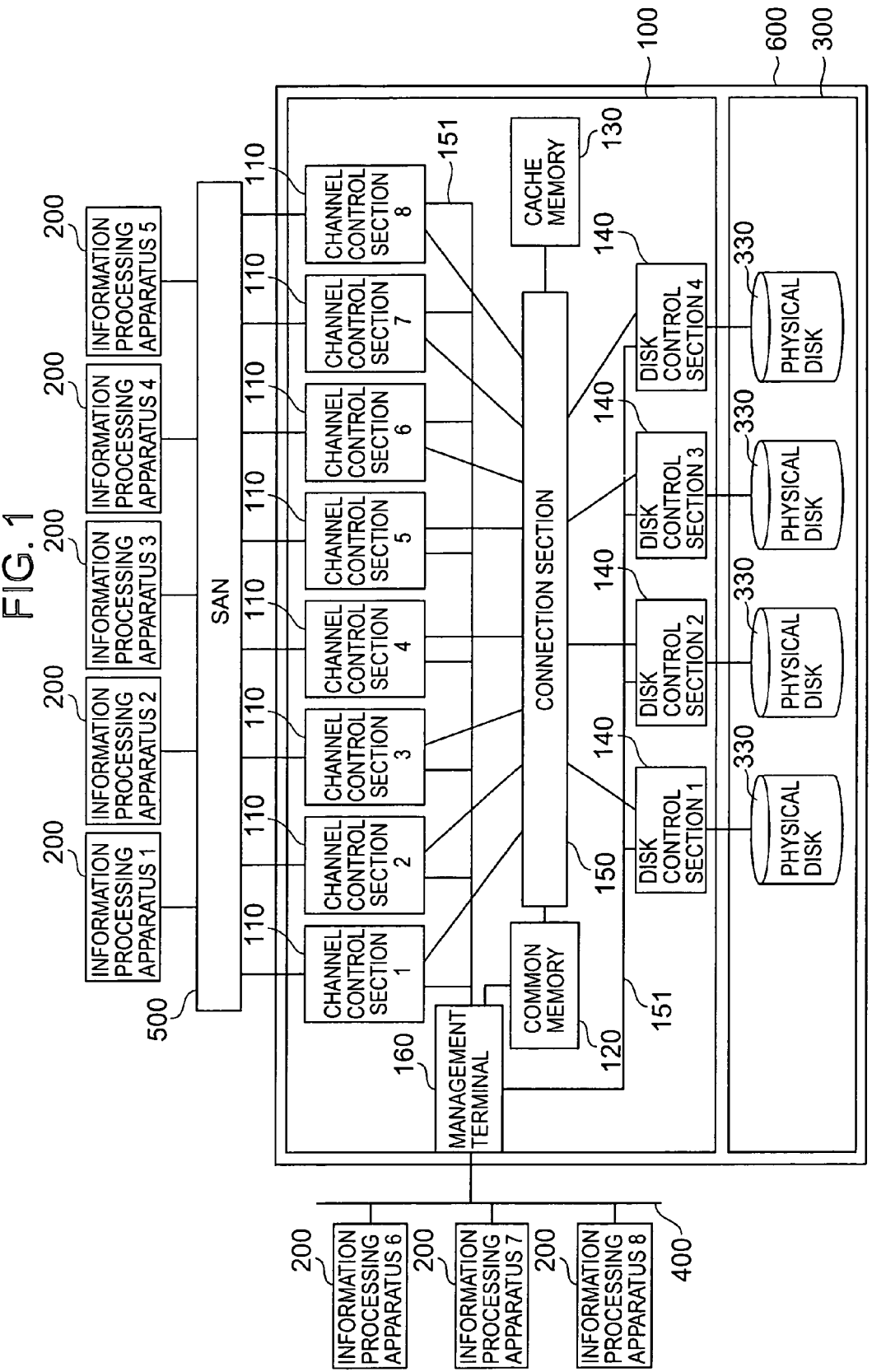
FIG. 1 is a block diagram showing the entire configuration of a storage system according to an embodiment of the present invention.

FIG. 1 is a block diagram showing an entire configuration of a storage system 600 including a storage control apparatus 100 according to an embodiment of the present invention.

The storage system 600 includes a storage control apparatus 100 and a storage drive 300. The storage control apparatus 100 controls the storage drive 300, for example, according to a command received from an information processing apparatus 200. For example, a data I/O request is received from information processing apparatuses 1 to 5 (200) and read/write of data stored in a physical disk drive 330 of the storage drive 300 is performed. Moreover, the storage control apparatus 100 receives, for example, various commands for managing the storage system 600 from information processing apparatuses 6 to 8 (200) and performs various settings of the storage system 600.

The information processing apparatus 200 is an information apparatus such as a computer having a CPU (central processing unit) and a memory. When various programs are executed by the CPU of the information processing apparatus 200, various functions are realized. The information processing apparatus 200 may be, for example, a personal computer or a work station or a main frame computer. The information processing apparatuses 1 to 5 (200) are used, for example, as a central computer in the automatic teller machine of a bank or in the aircraft seat reservation system. Moreover, the information processing apparatuses 6 to 8 (200) are used as a management computer for performing maintenance and management of the storage system 600.

Here, each information processing apparatus 200 may be an information processing apparatus 200 of different users. For example, the information processing apparatuses 1, 2, 6 (200) can be used as information processing apparatuses 200 of user A while the information processing apparatuses 3 to 5, 7 (200) can be used as information processing apparatuses 200 of user B. Moreover, the information processing apparatus 8 (200) may be an information processing apparatus 200 of the storage administrator who manages the entire storage system 600. Here, the user may be, for example, an enterprise or a department within the enterprise or an individual.

In FIG. 1, the information processing apparatuses 1 to 5 (200) are communicably connected to the storage control apparatus 100 via a storage area network (SAN) 500. The SAN 500 is a network for transmitting and receiving data to/from the information processing apparatuses 1 to 5 (200) on a block basis as a data management unit in the storage resources provided by the storage drive 300. Communication between the information processing apparatuses 1 to 5 (200) and the storage control apparatus 100 performed via the SAN 500 may be performed, for example, according to a fibre channel protocol.

The information processing apparatuses 1 to 5 (200) and the storage control apparatus 100 may not be connected via the SAN 500 but may be connected, for example, via the LAN (local area network) or may be connected directly without using a network. When they are connected via the LAN, communication may be performed, for example, according to the TCP/IP (Transmission Control Protocol/Internet Protocol) protocol. Moreover, when they are directly connected without using a network, communication can be performed, for example, according to the communication protocol such as FICON (Fibre Connection) (trade mark), ESCON (Enterprise System Connection) (trade mark), ACONARC (Advanced Connection Architecture) (trade mark), and FIBARC (Fibre Connection Architecture) (trade mark).

Moreover, the information processing apparatuses 6 to 8 (200) are connected to the storage control apparatus 100 via the LAN 400. The LAN 400 may be the Internet or a dedicated network. The communication between the information processing apparatuses 6 to 8 (200) and the storage control apparatus 100 performed via the LAN 400 may be performed, for example, according to the TCP/IP protocol.

[Storage Drive]

The storage drive includes a large number of physical disk drives 330. Thus, it is possible to provide a large capacity of storage region to the information processing apparatus 200. The physical disk drives 330 may be composed of a data storage medium such as hard disk drives or a plurality of hard disk drives constituting a n RAID (Redundant Arrays of Inexpensive Disks) (hereinafter, a plurality of hard disk drives constituting one RAID will be referred to as an RAID group or an ECC (error correction code) group). Moreover, in the physical volume which is a physical storage region provided by the physical disk drive 300, it is possible to set a logical volume (hereinafter, also referred to as LU) which is a logical storage region (hereinafter, a storage region for storing data including a physical volume and a logical volume will also be referred to as a storage volume 310).

The storage control apparatus can be directly connected to the storage drive 300 as shown in FIG. 1 and they can also be connected to each other via a network. Furthermore, the storage drive 300 and the storage control apparatus 100 may also be configured as a unitary block.

[Storage Control Apparatus]

The storage control apparatus 100 includes a channel control section 110, a common memory (second memory) 120, a cache memory (first memory) 130, a disk control section 140, a management terminal 160, and a connection section 150.

The storage control apparatus 100 communicates with the information processing apparatuses 1 to 5 (200) via the SAN 500 by the channel control sections 1 to 8 (110).

The channel control section 110 has a communication interface for communicating with the information processing apparatus 200 and has a function for transmitting/receiving a data I/O command to/from the information processing apparatus 200.

Each of the channel control sections 110 is connected together with the management terminal 160 via the internal LAN 151. Thus, it is possible to transmit and install a micro program to be executed by the channel control section 110 from the management terminal 160. Configuration of the channel control section 110 will be detailed later.

The connection section 150 connects the channel control section 110, the common memory 120, the cache memory 130, the disk control section 140, and the management terminal 160 to one another. Transmission and reception of data and commands between the channel control section 110, the common memory 120, the cache memory 130, the disk control section 140, and the management terminal 160 are performed via the connection section 150. The connection section is formed, for example, by a crossbar switch.

The common memory 120 and the cache memory 130 are storage memories shared by the channel control section 110 and the disk control section 140. The common memory is used mainly for storing control information and commands while the cache memory 130 is used mainly for storing data.

For example, when the data I/O request received from the information processing apparatus 200 by a channel control section 110 is a write command, the channel control section 110 writes the write command into the common memory 120 and writes the write data received from the information processing apparatus 120 into the cache memory 130. On the other hand, the disk control section 140 monitors the common memory 120. Upon detection of that a write command is written into the common memory 120, the disk control section 140 reads write data from the cache memory 130 according to the command and writes it into the storage drive 300.

Moreover, when the data I/O request received from the information processing apparatus 200 by a channel control section 110 is a read command, the channel control section 110 checks whether data to be read out is present in the cache memory 130. If any data is present in the cache memory 130, the channel control section 110 transmits the data to the information processing apparatus 200. On the other hand, when no data to be read out is present in the cache memory 130, the channel control section 110 writes the read command into the common memory 120 and monitors the common memory 120. When the disk control section 140 detects that the read command is written into the common memory, the disk control section 140 reads out data to be read from the storage drive 300, writes it into the cache memory 130, and reports/writes it to the common memory. When the channel control section 110 detects that data to be read out is written in the cache memory 130, it transmits the data to the information processing apparatus 200.

Thus, between the channel control section 110 and the disk control section 140, data is transmitted and received via the cache memory 130. In the cache memory 130, those data read/written by the channel control section 110 and the disk control section 140 are stored among the data stored in the physical disk drive 330.

It should be noted that besides the configuration that data write and read instructions from the channel control section 110 to the disk control section 140 is performed indirectly via the common memory 120, it is also possible to provide a configuration that, for example, data write/read instructions from the channel control section 110 to the disk control section 140 may be performed directly without using the common memory 120.

Moreover, the channel control section 110 can have the function of the disk control section 140 as a data I/O control section.

The disk control section 140 is communicatively connected to a plurality of physical disk drives 330 for storing data and controls the storage drive 300. For example, as has been described above, according to the data I/O request received from the information processing apparatus 200, the channel control section 110 reads/write data from/to the physical disk drive 330.

Each disk control section 140 is connected together with the management terminal by the internal LAN 151 and can communication with one another. Thus, it is possible to transmit and install a microprogram to be executed by the disk control section 140 from the management terminal 160. Configuration of the disk control section 140 will be detailed later.

In this embodiment, explanation has been given of a case that the common memory 120 and the cache memory 130 are arranged independently of the channel control section 110 and the disk control section 140. However, the present embodiment is not limited to this. It is also preferable that the common memory 120 or the cache memory 130 be arranged by being distributed to each of the channel control section 110 and the disk control section 140. In this case, the connection section 150 connects the channel control section 110 and the disk control section 140 having the distributed common memory 120 or the cache memory 130 to each other.

Moreover, it is also possible to constitute at least one of the channel control section 110, the disk control section 140, the connection section 150, the common memory 120, and the cache memory 130 as a unitary block.

[Management Terminal]

The management terminal is a computer for performing maintenance and management of the storage system 600. By operating the management terminal, an operator can set configuration of the physical disk drive 330 in the storage drive 300, set a path as a communication path between the information processing apparatus 200 and the channel control section 110, set a logical volume, and install a microprogram executed in the channel control section and the disk control section 140. Here, the setting of configuration of the physical disk drive 330 in the storage drive 300 includes, for example, increase or decrease of the number of physical disk drives 330 and modification of the RAID configuration (such as modification from RAID1 to RAID5). Furthermore, the management terminal 160 can check the operation state of the storage system 600, identifies a failed part, and install an operating system executed in the channel control section 110. These settings and control can be performed by an operator from the user interface of the management terminal 160 or the user interface of the information processing apparatuses 6 to 8 (200) displaying Web pages provided by the Web server operating on the management terminal 160. The operator can operates the management terminal 160 to set an object and a content to be monitored and set a failure notification destination.

The management terminal may be built in the storage control apparatus 100 or may be externally attached to the storage control apparatus 100. Moreover, the management terminal 160 may be a computer dedicated to maintenance and management of the storage control apparatus 100 and the storage drive 300 or may be a general-purpose computer having the maintenance and management functions.

Figures 4, 5:
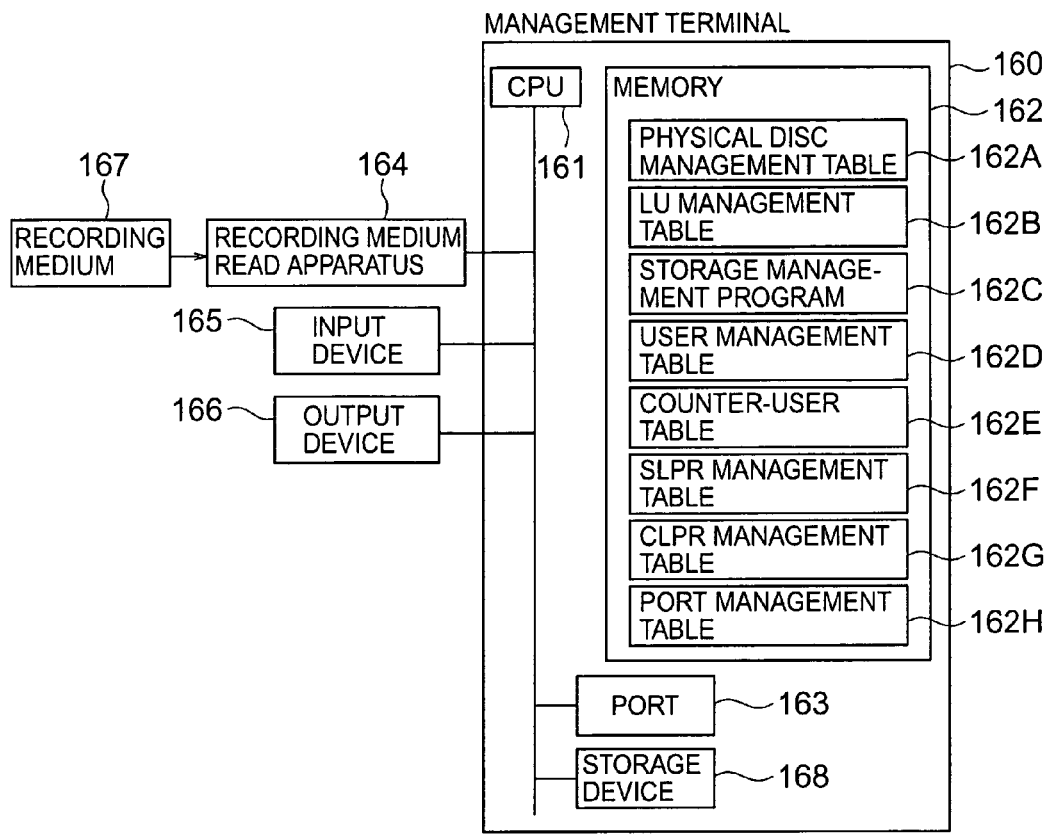
FIG. 4 is a block diagram showing the configuration of a management terminal according to the present embodiment.
FIG. 5 shows a physical drive management table according to the present embodiment.

FIG. 4 is a block diagram showing configuration of the management terminal 160.

The management terminal 160 includes a CPU 161, a memory 162, a port 163, a recording medium read device 164, an input device 165, and output device 166, and a storage device 168.

The CPU 161 controls the entire management terminal 160 and executes a storage management program 162C composed of codes for performing various operations stored in the memory 162, thereby providing the maintenance and management function of the storage system 600. Similarly, by executing the storage management program 162C, it is possible to realize the function as the aforementioned Web server. The memory 162 contains a physical disk drive management table 162A, an LU management table 162B, the storage management program 162C, a user management table 162D, a user-SLPR relation table 162E which represents a relationship between user and SLPR, an SLPR management table 162F, a CLPR management table 162G, and a port management table 162H.

The physical disk drive management table 162A is a table for managing the physical disk drive 330 arranged in the storage drive 300. FIG. 5 shows the physical disk drive management table 162A. FIG. 5 shows the disk numbers #001 to #006 among the plenty of physical disk drives 330 in the storage drive 300. For each of the physical disk drives 330, capacity, RAID configuration, the use state, and the ECC group number are shown.

Figures 6, 7:
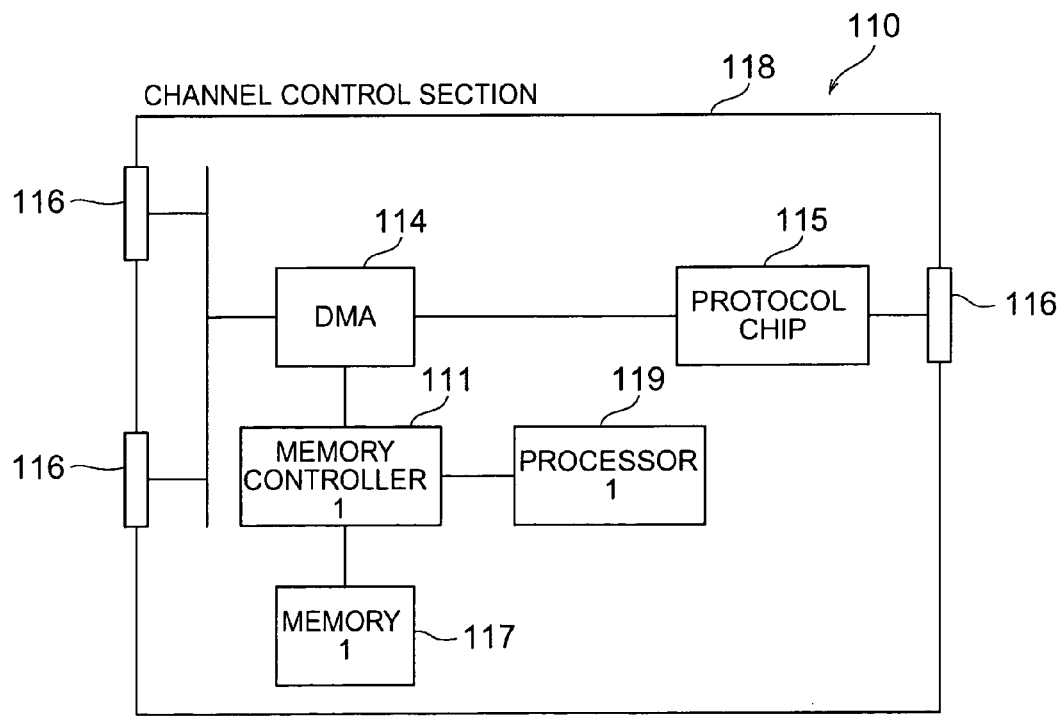
FIG. 6 shows an LU (logical unit) management table according to the present embodiment.
FIG. 7 is a block diagram showing a channel control section according to the present embodiment.

The LU management table 162B is a table for managing the logical volume logically set on the physical disk drive 330. FIG. 6 shows the LU management table 162B. FIG. 6 shows LU number #1 to #3 among the plenty of logical volumes set on the storage drive 300. For each of the logical volumes, the physical disk drive number, capacity, RAID configuration, and CLPR to which it belongs are shown. The CLPR will be detailed later.

Figure 18:
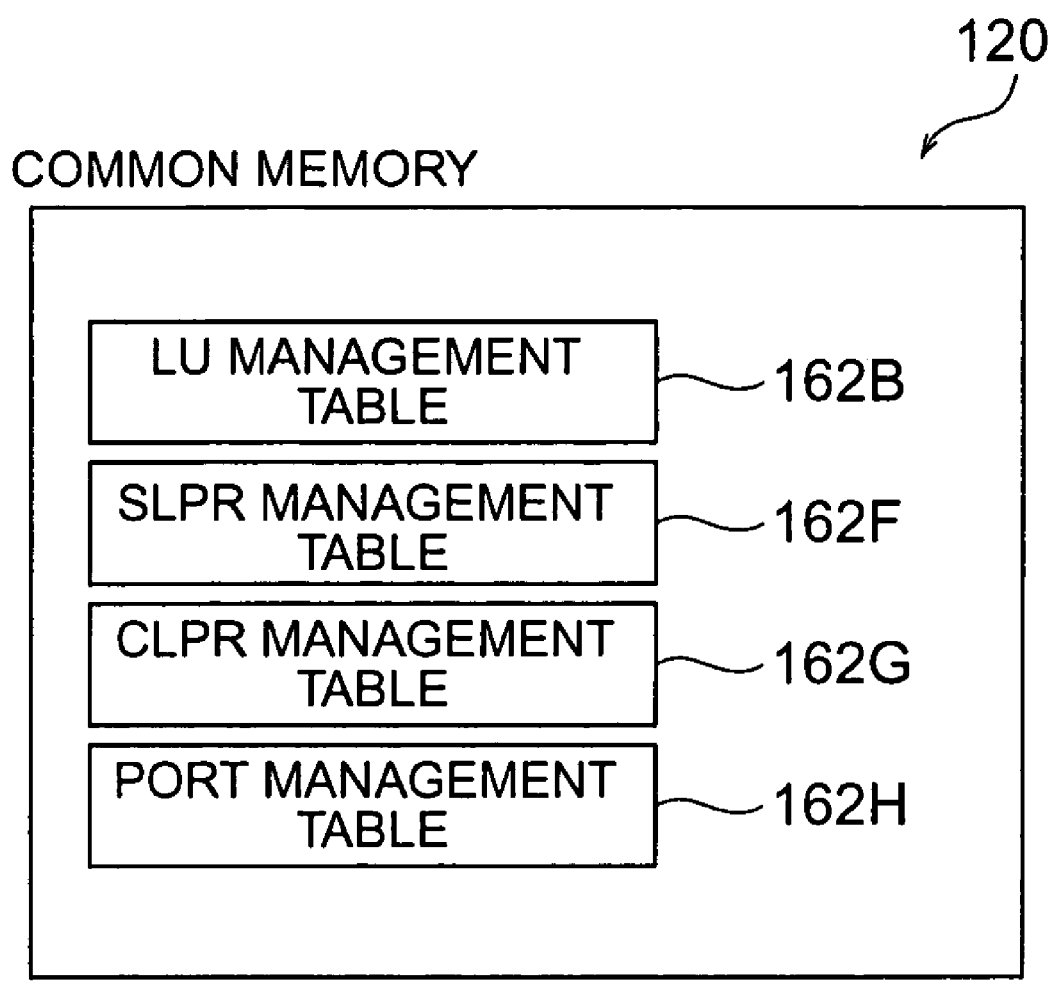
FIG. 18 shows a common memory according to the present embodiment.

Moreover, the other tables stored in the memory 162 of the management terminal 160, i.e., the user management table 162D, the user-SLPR relation table 162E, the SLPR management table 162F, the CLPR management table, and the port management table 162H will be detailed later. It should be noted that the LU management table 162B, the SLPR management table 162F, the CLPR management table 162G, and the port management table 162H are management information on the storage resources allocated for each of the users using the information processing apparatus 200 such as a communication port, the physical disk drive 330, and the storage capacity of the cache memory. As shown in FIG. 18, these information are stored in the common memory 120. Their duplicates are stored in the memory 162 of the management terminal 160.

The recording medium read apparatus 164 is an apparatus for reading a program and data stored in the recording medium 167. The program and data read are stored in the memory 162 and the storage apparatus 168. Accordingly, for example, it is possible to read the storage management program 162C stored in the recording medium 167 from the recording medium 167 by using recording medium read apparatus 164 and store it in the memory 162 and the storage apparatus 168. The recording medium 167 may be a flexible disk, a CD-ROM, or a semiconductor memory. The recording medium read device 164 may be built in the management terminal 160 or externally attached to it. The storage device 168 is, for example, a hard disk or a semiconductor storage device. The input device 165 is a user interface used for data input to the management terminal 160 by an operator. The input device may be, for example, a keyboard and a mouse. The output device 166 is a user interface for outputting information outside. The output device 166 may be, for example, a display and a printer. The port 163 is connected to the internal LAN 151. Thus, the management terminal 160 can communicate with the channel control section 110 and the disk control section 140. Moreover, the port 163 is also connected to the connection section 150. Thus, the management terminal 160 can write and read data to/from the common memory 120 and the cache memory 130. Moreover, the port 163 is also connected to the LAN 400. Thus, the management terminal 160 can communicate with the information processing apparatuses 6 to 8 (200).

[External View]

Figure 2:
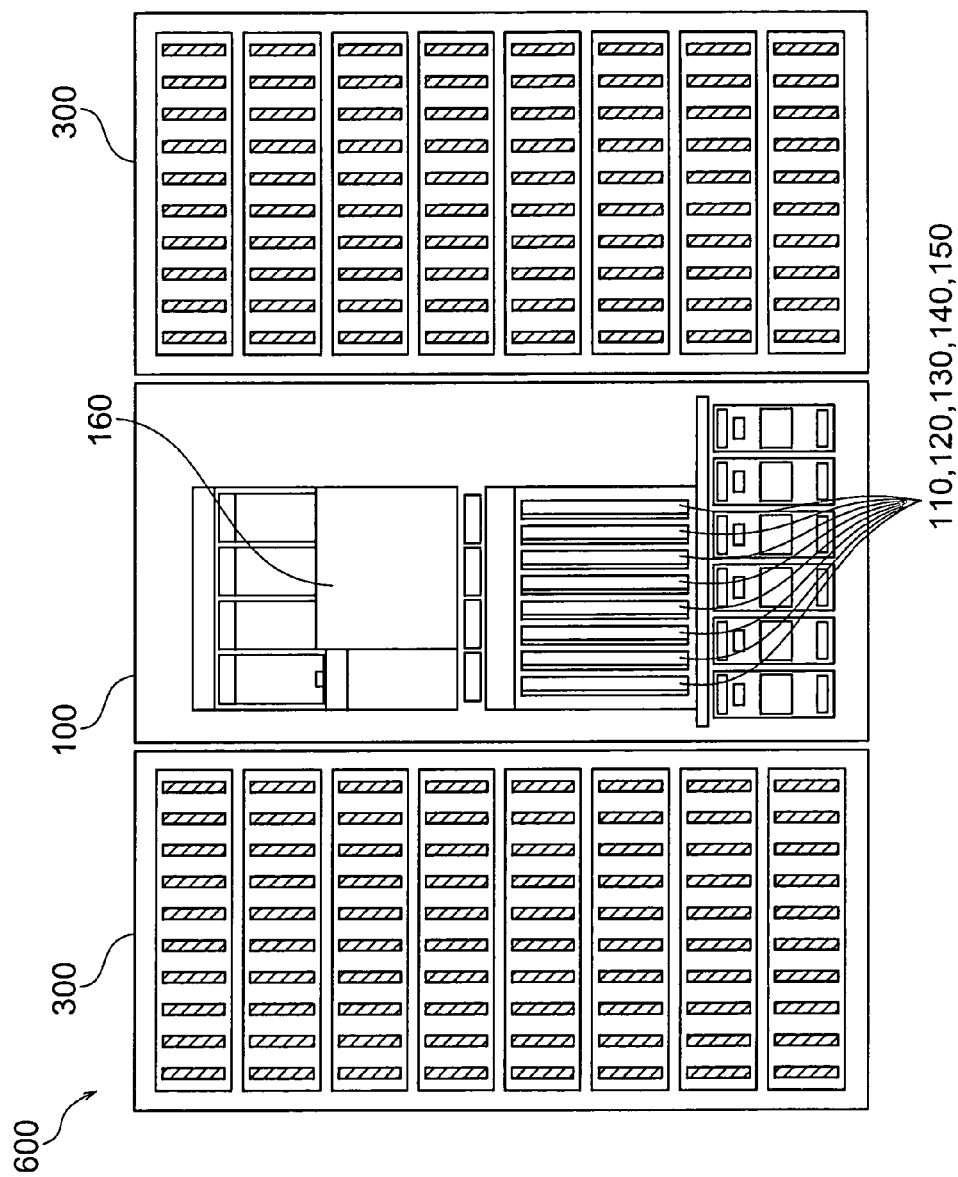
FIG. 2 shows an external configuration of the storage system according to the present embodiment.
Figure 3:
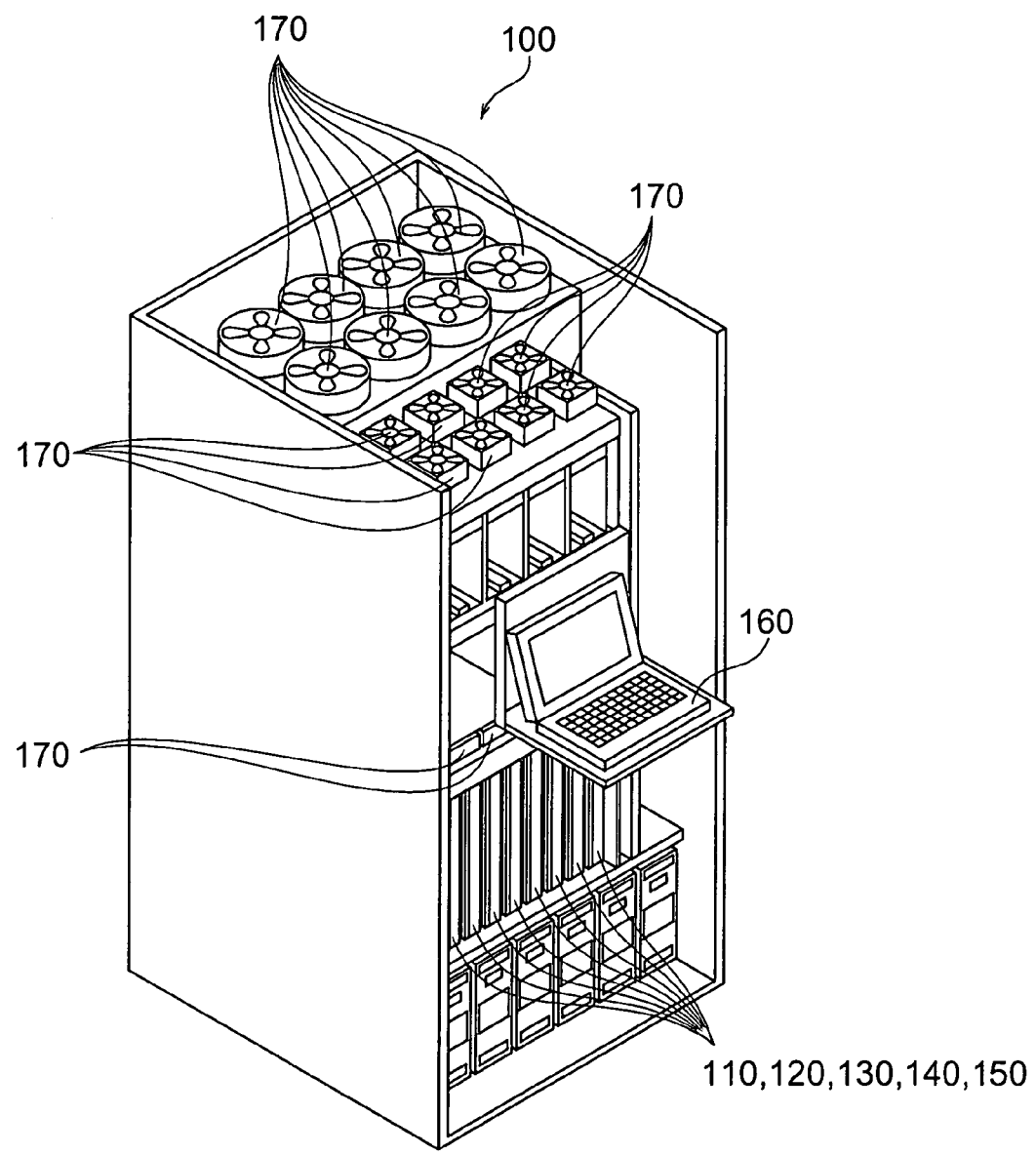
FIG. 3 shows an external configuration of a storage control apparatus according to the present embodiment.

Next, FIG. 2 shows an external configuration of the storage system 600 according to the present embodiment. Moreover, FIG. 3 shows an external configuration of the storage control apparatus 100.

As shown in FIG. 2, the storage system 600 according to the present embodiment includes the storage control apparatus 100 and the storage drive 300, each contained in a case.

In the example shown in FIG. 2, the case of the storage control apparatus 100 is sandwiched between the cases of the storage drives 300.

The storage control apparatus 100 has the management terminal 160 at the front center. The management terminal 160 is covered with a cover. As shown in FIG. 3, the management terminal 160 can be used by opening the cover. It should be noted that the management terminal 160 shown in FIG. 3 is a laptop but it can be in any form.

Below the management terminal 160, there are provided slots for mounting the channel control section 110, the disk control section 140, the cache memory 130, the common memory 120, and the connection section 150. The channel control section 110, the disk control section 140, the cache memory 130, the common memory 120, and the connection section 150 are configured as boards having circuit substrates, which are mounted in the respective slots. Each slot has a guide rail for mounting these boards. The channel control section 110, the disk control section 140, the cache memory 130, the common memory 120, and the connection section 150 can be mounted on the storage control apparatus 100 by inserting the respective boards along the guide rails into the slots. At the front of each slot in the depth direction, there is provided a connector for electrically connecting the respective boards to the storage control apparatus 100.

Moreover, the storage control apparatus 100 is provided with a fan 170 for diskharging heat generated from the channel control section 110. The fan 170 is also provided above the slots in addition to above the storage control apparatus 100.

[Channel Control Section]

FIG. 7 shows a configuration of the channel control section 110. The channel control section 110 is a unit board having a circuit substrate 118. The channel control section 110 has one or more circuit substrates 118. On the circuit substrate 118, there are formed a processor 1 (119), a protocol chip 115, a DMA (Direct Memory Access) (114), a memory 1 (117), a memory controller (111), and a connector 116.

The protocol chip 115 provides a communication interface function for communicating with the information processing apparatus 200. For example, the protocol chip 115 controls reception of a data I/O request transmitted from the information processing apparatus 200 according to the fibre channel protocol and data transmission/reception. The connector 116 connected to the protocol chip 115 constitutes a communication port communicatively connected to some of the plurality of the information processing apparatuses 200.

The processor 1 (119), the memory 1 (117), the DMA 114, and the memory controller 1 (111) receive a data I/O request for the data stored in the physical disk drive 330 from the information processing apparatus 200 via the communication port and transmit and receive data and commands to/from the disk control section 140, the cache memory 130, the common memory 120, and the management terminal 160.

According to the instruction from the processor 1 (119), the DMA 114 transfers the data transmitted from the information processing apparatus 200 to the cache memory 130 and transmits the data stored in the cache memory 130 to the information processing apparatus 200.

When the connector 116 connected to the DMA 114 is engaged with the connector of the side of the storage control apparatus 100, the channel control section 110 is electrically connected to the connection section 150 of the storage control apparatus 100 and the management terminal 160.

[Disk Control Section]

Figure 8:
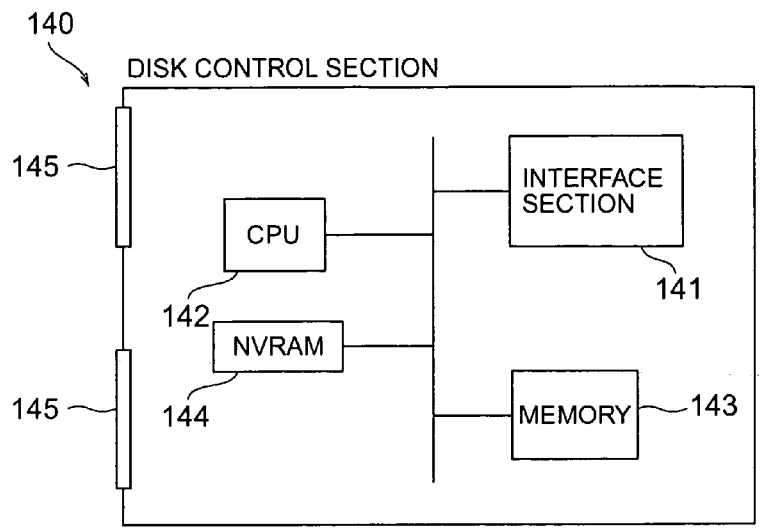
FIG. 8 is a block diagram showing a disk control section according to the present embodiment.

Next, FIG. 8 shows a configuration of the disk control section 140.

The disk control section 140 includes an interface section 141, a memory 143, a CPU 142, an NVRAM (nonvolatile random-access memory) 144, and a connector 145, which are formed as a unitary block.

The interface section 141 includes a communication interface for communicating with the channel control section 110 via the connection section and a communication interface for communicating with the storage drive 300.

The CPU 142 controls the entire disk control section 140 and communicates with the channel control section 110, the storage drive 300, and the management terminal 160. The CPU executes various programs stored in the memory 143 and the NVRAM 144, thereby realizing the function of the disk control section 140 according to the present embodiment.

The NVRAM 144 is a non-volatile memory containing a program for controlling the CPU 142. The contents of the program stored in the NVRAM 144 may be written or rewritten by the instruction from the management terminal 160.

Moreover, the disk control section 140 has a connector 145. When the connector 145 is engaged with the connector of the side of the storage control apparatus 100, the disk control section 140 is electrically connected with the connection section 150 of the storage control apparatus 100, the storage drive 300, and the management terminal 160.

[Information Processing Apparatus]

Figure 9:
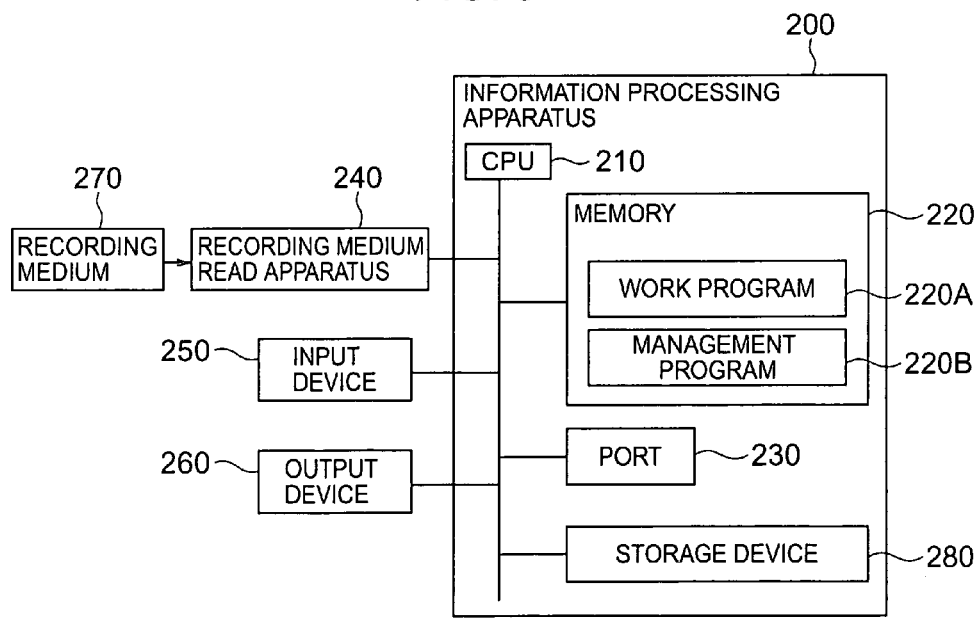
FIG. 9 is a block diagram showing an information processing apparatus according to the present embodiment.

Next, FIG. 9 is a block diagram showing a configuration of the information processing apparatus 200 according to the present embodiment. The information processing apparatus 200 includes a CPU 210, a memory 220, a port 230, a recording medium read apparatus 240, an input device 250, an output device 260, and a storage device 280.

The CPU 210 controls the entire information processing apparatus 200 and executes an application program 220A and a management program 220B including codes for performing various operations stored in the memory 220, thereby realizing various functions according to the present embodiment. For example, an information processing service such as the aforementioned automatic teller machine service of a bank is executed by the CPU 210 which executes the application program 220A. Moreover, the CPU 210 executes the management program 220B so that it is possible to display a Web page provided by a Web server operating on the aforementioned management terminal 160, modify the configuration of the physical disk drive 330, set a path as a communication path between the information processing apparatus 200 and the channel control section 110, set the logical volume 310, and the like. The recording medium read apparatus 240 is an apparatus for reading a program and data recorded on the recording medium 270. The program and data which have been read are stored in the memory 220 and the storage device 280.

Accordingly, for example, it is possible to read the application program 220A and the management program 220B recorded on the recording medium 270 from the recording medium 270 by using the recording medium read apparatus 240 and store them in the memory 220 and the storage device 280. The recording medium 270 may be a flexible disk, a CD-ROM, a semiconductor memory, or the like. The recording medium read apparatus 240 may be built in the information processing apparatus 200 or externally attached to it. The storage device 280 may be, for example, a hard disk apparatus or a semiconductor storage apparatus. Moreover, the storage device 280 may be built in the information processing apparatus 200 or externally attached to it. When externally attached, it is possible to use the storage device 280 of another information processing apparatus 200 connected via a communication network. Moreover, it is possible to use the storage system 600 connected via the SAN 500.

The input device 250 is a user interface used for data input to the information processing apparatus 200 by an operator operating the information processing apparatus 200. The input device 250 may be, for example, a keyboard and a mouse. The output device 260 is a user interface for outputting information outside. The output device 260 may be, for example, a display and a printer. The port 230 may be a device for communicating with the storage control apparatus 100 via the SAN 500. In this case, the port 230 may be, for example, composed of an HBA (Host Bus Adapter). Moreover, the port 230 may be an apparatus for communicating with another information processing apparatus 200 via a communication network such as the LAN 400. In this case, it is possible to receive, for example, the application program 220A and the management program 220B via the port 230 from the other information processing apparatus 200 and store them in the memory 220 and the storage device 280.

It should be noted that FIG. 9 shows an example that the application program 220A and the management program 220B are both stored in the memory 220 but it is also possible that only one of them is stored in the memory 220. For example, in the information processing apparatuses 1 to 5 (200) in FIG. 1, only the application program 220A is stored in the memory 220 while in the information processing apparatuses 6 to 8 (200), only the management program 220B is stored in the memory 220.

[Partition of Storage System]

Figure 10:
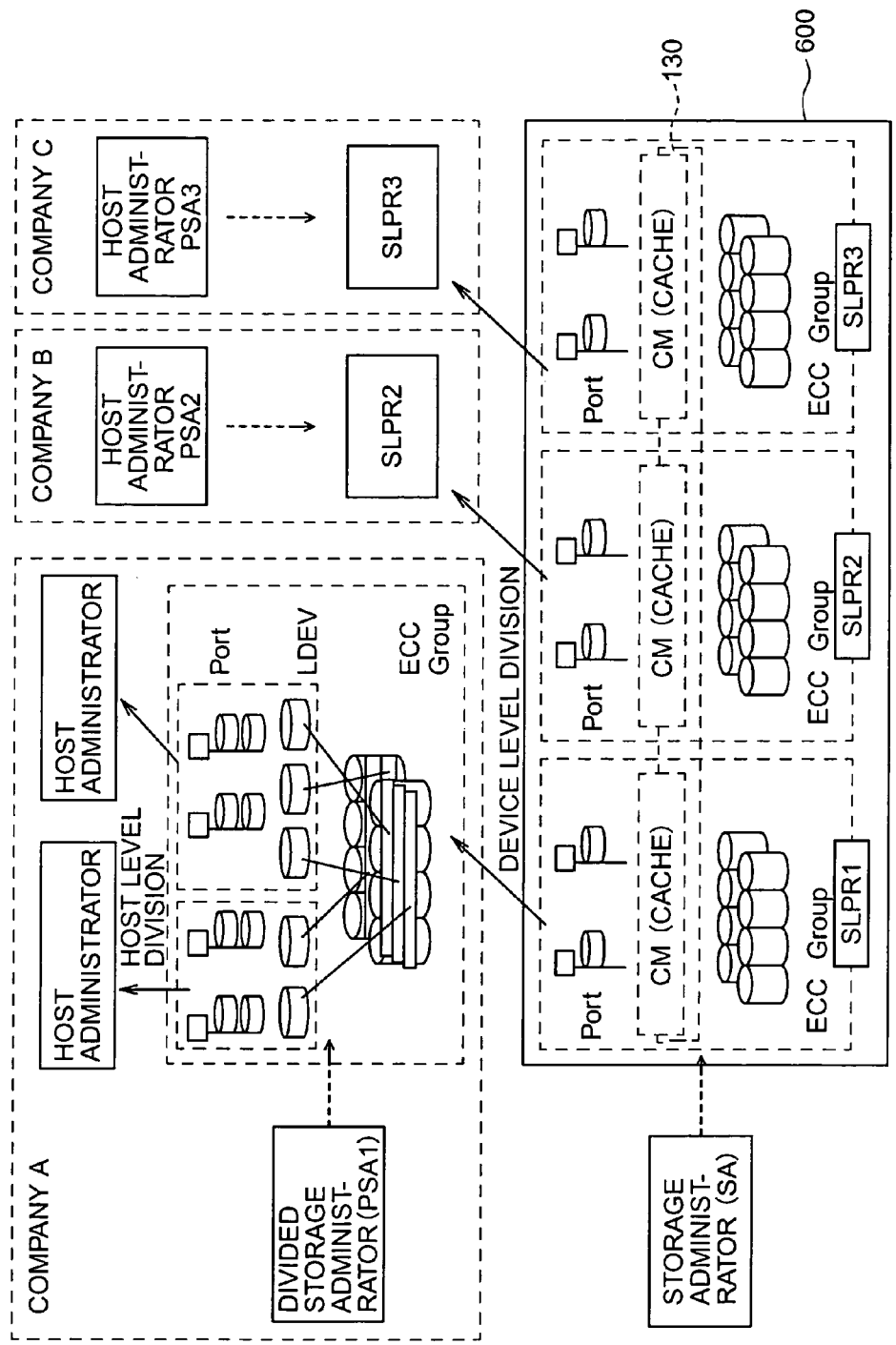
FIG. 10 shows storage resources of the storage system according to the present embodiment divided and allocated to a plurality of users.

As has been described above, the storage system 600 according to the present embodiment is shared by a plurality of users. That is, storage resources including the communication port, the physical disk drive 330, the storage capacity of the cache memory 130 provided by the storage system 600 are partitioned to for each user, who uses the storage resources within the range allocated for him/her. FIG. 10 shows how the storage system 600 according to the present embodiment is partitioned to be provided to a plurality of users. In FIG. 10, the communication port, the cache memory 130, and the physical disk drive 330 of the storage system 600 are partitioned into three, which are allocated to company A, company B, and company C. In each of the company A, company B, and company C, a system administrator (partitioned storage administrator) is present and they performs setting for using the storage system 600 within the range of the storage resources allocated for their companies. For example, each administrator sets the logical volume for the physical disk drive 330 allocated for his/her company and sets a path as a communication path for accessing the logical volume from the information processing apparatus 200 of his/her company.

On the other hand, there is a system administrator (storage administrator) who allocates the storage resources of the storage system 600 for the respective companies who use the storage resources. The storage administrator may be a staff of a storage service provider who provides the storage resources of the storage system 600.

Figure 11:
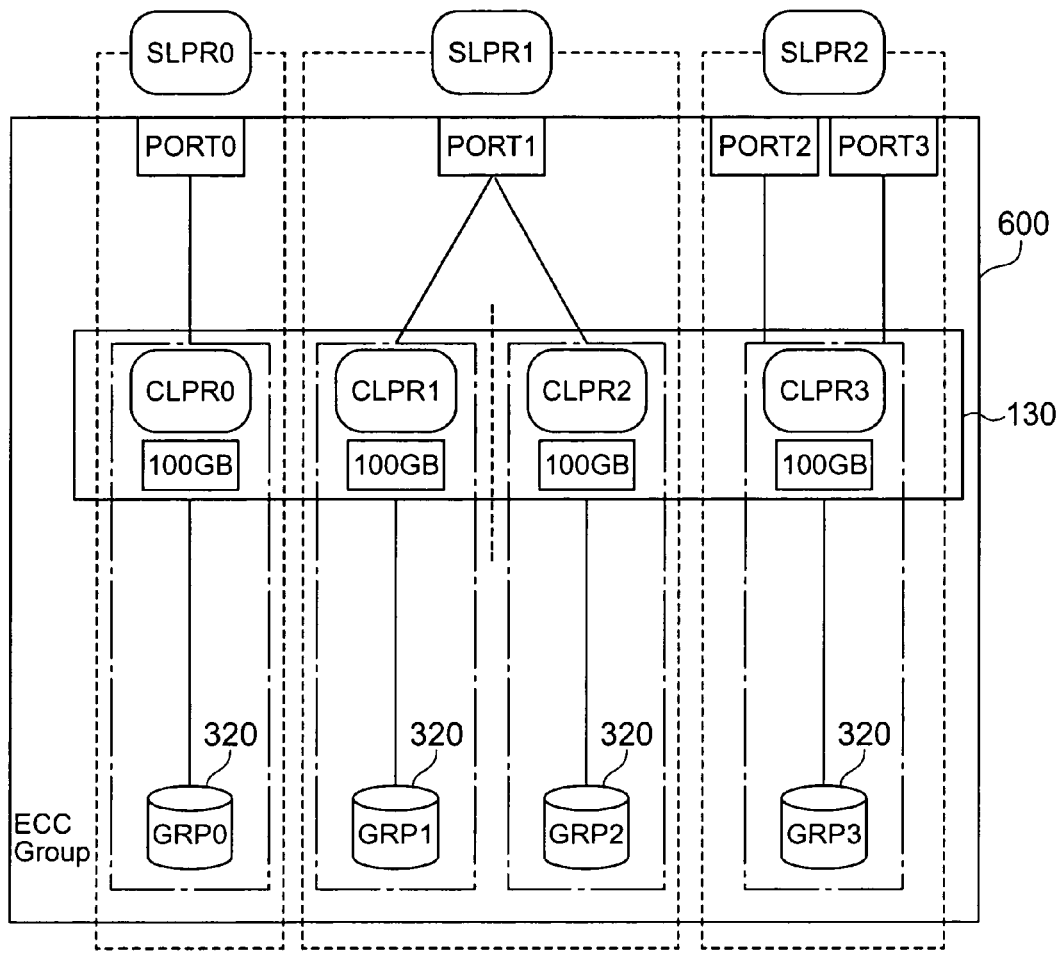
FIG. 11 shows how the storage resources of the storage system according to the present embodiment are divided.

FIG. 11 shows an outline of partition of storage resources in the storage system 600 according to the present embodiment.

That is, in the storage system 600 according to the present embodiment, storage resources area allocated for each user by the group SLPR. For example, as shown in the user-SLPR relation table 162E in FIG. 17, it is possible to allocate SLPR0 for user_A (for example, company A in FIG. 10), SLPR1 for user_B (for example, company B in FIG. 10), and SLPR2 for user_C (for example, company C in FIG. 10). It should be noted that all the SLPR are allocated for the storage administrator.

The communication port and the CLPR (first correlation) are correlated to each SLPR (second correlation). In the example of FIG. 11, PORT 0 (communication port 0) and CLPR0 are allocated for SLPR0; PORT1 (communication port 1), CLPR1, and CLPR2 are allocated for SLPR1; and PORT2 (communication port 2), PORT3 (communication port 3), and CLPR3 are allocated for SLPR2.

In each CLPR (first correlation), ECC group 320 is correlated to a data amount which can be stored in the cache memory 130 (storage capacity of the cache memory) among the data stored in the ECC group 320. In the example of FIG. 11, for CLPR0, ECC group 0 and the storage capacity of the cache memory 130 of 100 GB (giga bytes) are allocated; for CLPR1, ECC group 1 and the storage capacity of the cache memory 130 of 100 GB are allocated; for CLPR2, ECC group 2 and the storage capacity of the cache memory 130 of 100 GB are allocated; and for CLPR3, ECC group 3 and the storage capacity of the cache memory 130 of 100 GB are allocated.

By the aforementioned allocation, company A can use PORT0 to use the physical disk drive 330 of ECC group 0 and the cache memory 130 of 100 GB, company B can use PORT1 to use the physical disk drive 330 of ECC group 1, the physical disk drive 330 of ECC group 2, and the cache memory 130 of 100 GB for each of the physical disk drives 330, and company C can use PORT2 and PORT3 to use the physical disk drive 330 of ECC group 3 and the cache memory 130 of 100 GB.

Figure 12:
FIG. 12 shows a CLPR (Cache Logical Partition) management table according to the present embodiment.

A CLPR management table 162G shown in FIG. 12 contains and correlates the ECC group 320 and the storage capacity of the cache memory 130 allocated for each CLPR.

The CLPR management table 162G has an "identifier" column, a "cache capacity" column, an "ECC Group" column, and a "belonging SLPR identifier" column. In the "identifier" column, identifiers of the CLPR groups are described. In the "cache capacity" column, the storage capacity of the cache memory 130 allocated for each CLPR is described. In the "ECC Group" column, the identifier of the ECC group 320 allocated for each CLPR is described. In the "belonging SLPR identifier" column, the identifier of SLPR for which the CLPR is allocated is described.

Moreover, the physical disk drive management table 162A shown in FIG. 5 has the "ECC group" column. For this, by referencing the physical disk drive management table 162A and the CLPR management table 162G, it is possible to identify to which CLPR group each physical disk drive 330 belongs and furthermore to which SLPR group it belongs.

Moreover, the LU management table 162B shown in FIG. 6 has the "belonging CLPR" column. By this, it is possible to correlate each CLPR group to the logical volume logically set in the ECC group 320 allocated for the CLPR group. It should be noted that as has been described above, setting of a logical volume may be performed by the partitioned storage administrator who manages the storage resources of the storage system 600 allocated for him/her, By the way, in the storage system 600 according to the present embodiment, a storage capacity of the cache memory 130 is allocated for each CLPR. By allocating a storage capacity of the cache memory 130 to each CLPR, each user sharing the storage system 600 can use the cache memory 130 allocated for him/her without being affected by use of the storage system 600 by other users. That is, in the storage system 600 according to the present embodiment, it is possible to partition and provide the cache memory 130 for each user. Accordingly, in the storage system 600 according to the present embodiment, even when a plurality of users share the storage system 600, the cache hit ratio of each user is not affected by the use of the storage system 600 by other users. Thus, it is possible to realize a storage consolidation capable of providing storage resources independently without depending on the other users.

Figures 13, 14:
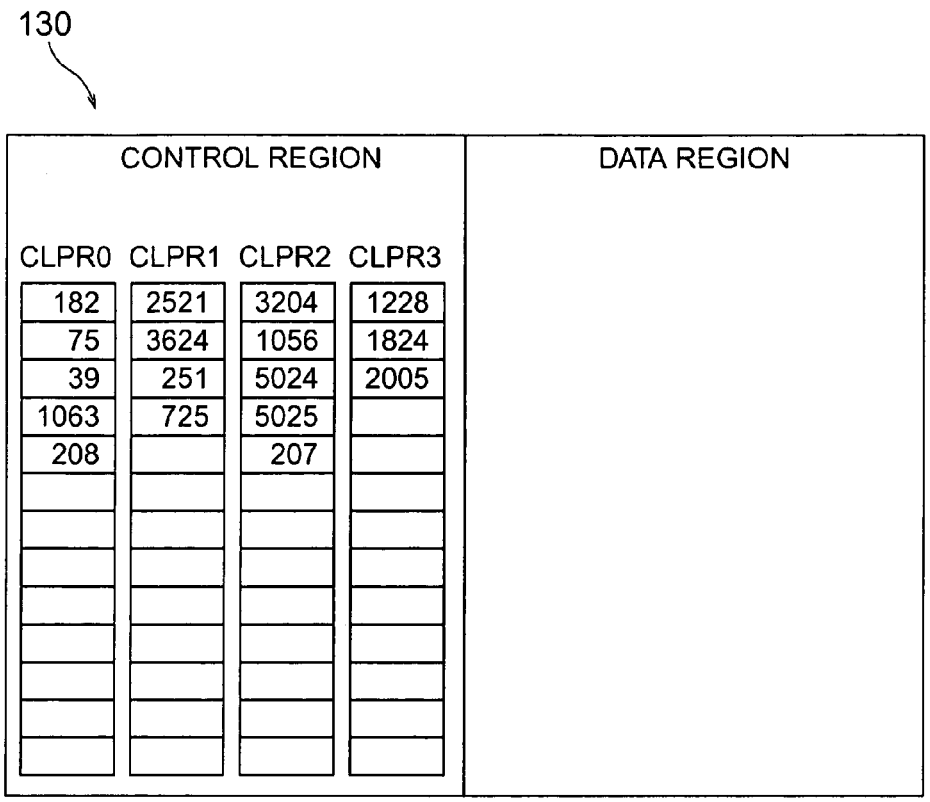
FIG. 13 shows a cache memory according to the present embodiment.
FIG. 14 shows an SLPR (Storage Logical Partition) management table according to the present embodiment.

Since a storage capacity of the cache memory 130 is allocated for each CLPR, as shown in FIG. 13, the cache memory 130 according to the present embodiment has a control region and a data region. The data region is a region for storing data. Like the ordinary cache memory, the data region has an address for each predetermined block data length. On the other hand, the control region stores the data block number in use for each CLPR. The number of data blocks allocated for each CLPR is increased or decreased according to the storage capacity of the cache memory 130 allocated for each CLPR. In this embodiment, since the storage capacity of 100 GB is allocated for each of CLPR0 to CLPR3, in the example of FIG. 13, the same number of data blocks is allocated for each of them. The number of data blocks allocated for each CLPR may be modified, for example, by the instruction from the management terminal 160.

Next, FIG. 14 shows an SLPR management table 162F showing allocation of each SLPR group.

The SLPR management table 162F has a "usable CU number" column and a "usable SSID" column. The "usable CU number" column describes the number of CU (Control Unit) allocated for each SLPR. The CU is a logical storage system 600 set in the storage system 600. Each CU is controlled as if it were an independent storage system 600 with respect to the information processing apparatus 200. The "usable SSID" column describes the number of SSID (Storage Subsystem Identification) allocated for each SLPR. The SSID is an identifier set for a predetermined number of sections of the number of LDEV (Logical DEVice) logically set in each ECC group 320. It should be noted that in the SLPR management table 162F, one of the "usable CU number" column and the "usable SSID" column can be omitted. For example, when the information processing apparatuses 1 to 5 (200) are main frame based computers, only the "usable SSID" column may be present. Moreover, when the information processing apparatuses 1 to 5 (200) are open-based computers, only the "usable CU number" column may be present.

The port management table 162H shown in FIG. 15 shows allocation of the communication port of each SLPR. The port management table 162H has a "PORT number" column and a "belonging SLPR identifier" column. The "PORT number" column describes the identifier of the communication port. The "belonging SLPR identifier" column describes the identifier of SLPR where the communication port is allocated.

By using the aforementioned tables, the storage resources of the storage system 600 according to the present embodiment can be partitioned and allocated to each user.

Figure 19:
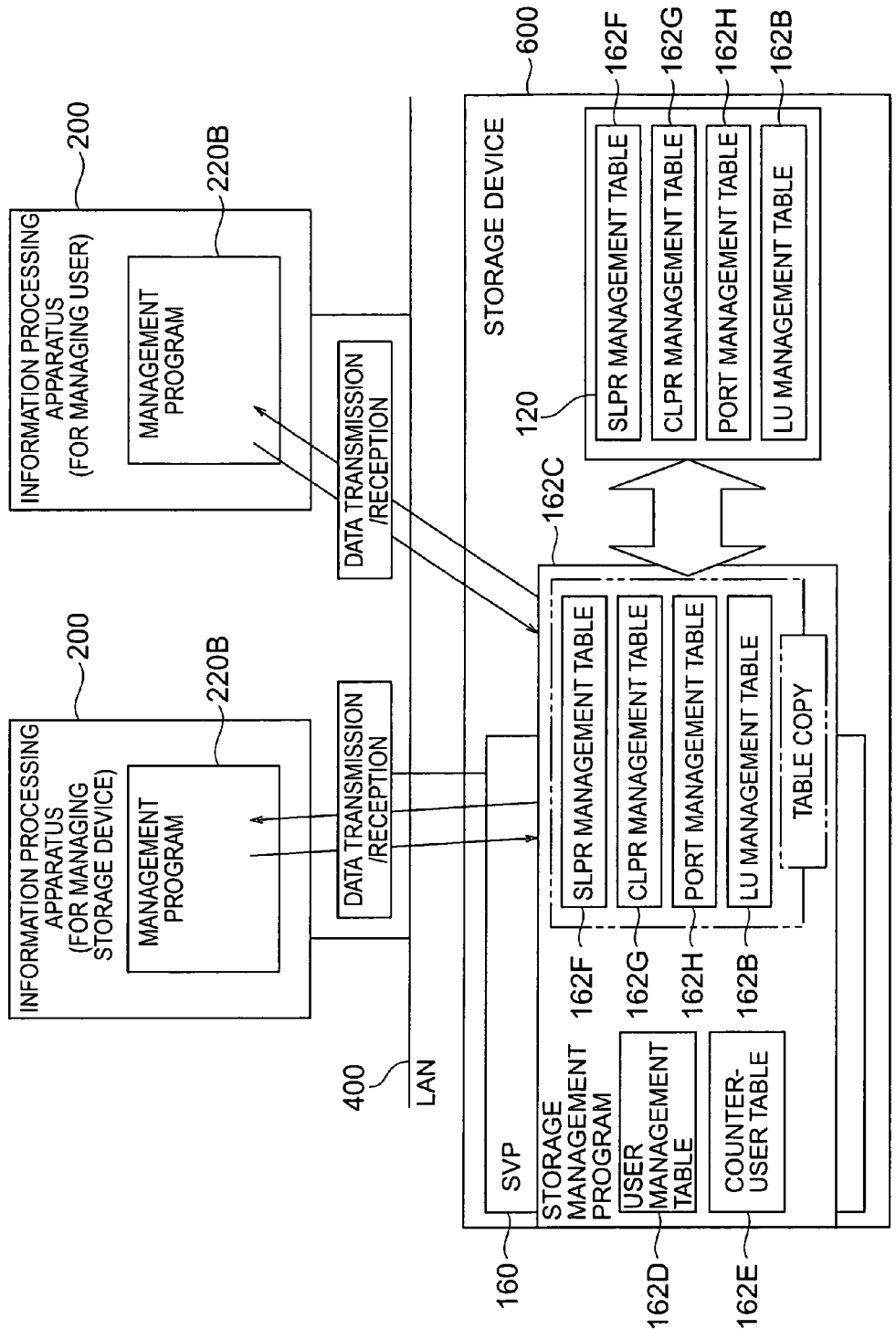
FIG. 19 shows a system configuration when partitioning and allocating storage resources in the storage system according to the present embodiment.
Figure 20:
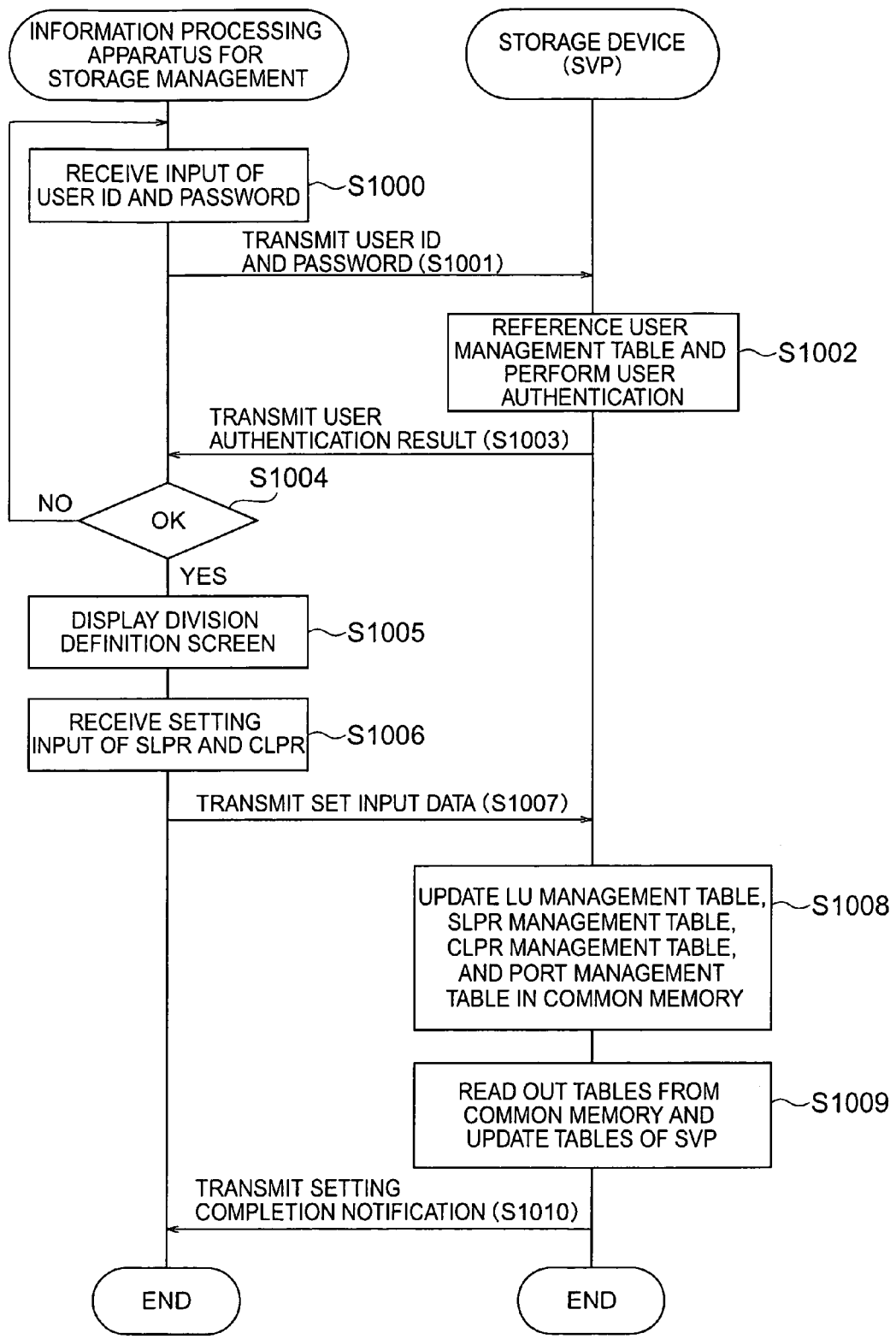
FIG. 20 is a flowchart showing the processing flow when partitioning and allocating storage resources according to the present embodiment.

Next, explanation will be given of the allocation of the storage resources to each user with reference to FIG. 19 to FIG. 21. FIG. 19, like FIG. 1, shows a system configuration including the storage system 600 according to the present embodiment. In FIG. 19, the information processing apparatus (hereinafter, also referred to as an information processing apparatus for storage apparatus management) 200 described as an information processing apparatus (for storage apparatus management) is the information processing apparatus 200 used by the aforementioned storage administrator. For example, it can be the information processing apparatus 8 (200) in FIG. 1. Moreover, in FIG. 19, the information processing apparatus (hereinafter, also referred to as an information processing apparatus for user management) 200 described as the information processing apparatus (for user management) is the information processing apparatus 200 used by the aforementioned partitioned storage administrator. For example, it can be the information processing apparatuses 6 and 7 (200) in FIG. 1.

Explanation will be given on the processing flow for allocating storage resources to each user with reference to a flowchart of FIG. 20. It should be noted that the processing described below is realized by the CPU 210 of the information processing apparatus 200 and the CPU 161 of the management terminal 160 which execute the management program 220B composed of codes for performing various operations stored in the memory 220 and the storage management program 162C composed of codes for performing various operations stored in the memory 162, respectively.

Firstly, the information processing apparatus 200 for storage apparatus management receives a user ID and a password input from the user interface by the storage administrator (S1000). Then, the information processing apparatus 200 for storage apparatus management transmits the user ID and the password via the LAN 400 to the management terminal 160 (S1001). The management terminal refers to the user management table 162D stored in the memory 162 and performs user authentication (S1002). FIG. 16 shows a user management table 162D.

The user management table 162D has a "user ID" column, a "user name" column, a "password" column, and a "remark" column. The "user ID" column describes the identifier of the partitioned storage administrator or the storage administrator. The "user name" column describes the partitioned storage administrator name or the storage administrator name. The "password" column describes the password of the partitioned storage administrator or the storage administrator. The "remark" column describes remarks when required.

The management terminal 160 refers to the user management table 162D to check the user ID and the password transmitted from the information processing apparatus 200 for storage apparatus management and to perform authentication of the storage administrator. Thus, by performing authentication of the storage administrator, it is possible to prevent modification of the configuration of the storage system 600 by an unauthorized third person pretending to be the storage administrator.

The management terminal 160 transmits the authentication result to the information processing apparatus 200 for storage apparatus management (S1003). When the information processing apparatus 200 for storage apparatus management is authorized as the storage administrator from the management terminal 160, control is passed to "Yes" and a partition definition screen is displayed on the user interface (S1005). The display of the partition definition screen can also be performed by displaying a Web page transmitted from the management terminal 160.

FIG. 21 shows an example of the partition definition screen. As has been described above, all the SLPR are allocated to the storage administrator. For this, as shown in FIG. 21, the storage administrator can refer to and update allocation information on all the storage resources of the storage system 600. The storage administrator sets and inputs the aforementioned SLPR and CLPR through the partition definition screen. When the "OK" column is clicked by superimposing the cursor of the mouse in the partition definition screen, the content input by the storage administrator is accepted by the information processing apparatus 200 for storage apparatus management (S1006). Then, the information processing apparatus 200 for storage apparatus management transmits the content to the management terminal 160 (S107).

The management terminal 160 updates the contents of the LU management table 162B, the SLPR management table 162F, the CLPR management table 162G, and the port management table 162H of the common memory 120 (S1008). Then, the LU management table 162B, the SLPR management table 162F, the CLPR management table 162G, and the port management table 162H are read from the common memory 120 and the contents of these tables stored in the memory 162 of the management terminal 160 are updated (S1009). After this, the management terminal 160 transmits a setting end notification to the information processing apparatus 200 for storage apparatus management (S1010). By the aforementioned processing, the storage administrator can partition and allocate the storage resources of the storage system 600. It should be noted that here has been given an example of setting the SLPR and the CLPR by using the information processing apparatus 200 for storage apparatus management but it is also possible to perform these settings from the management terminal 160 without using the information processing apparatus 200 for storage apparatus management.

Figure 22:
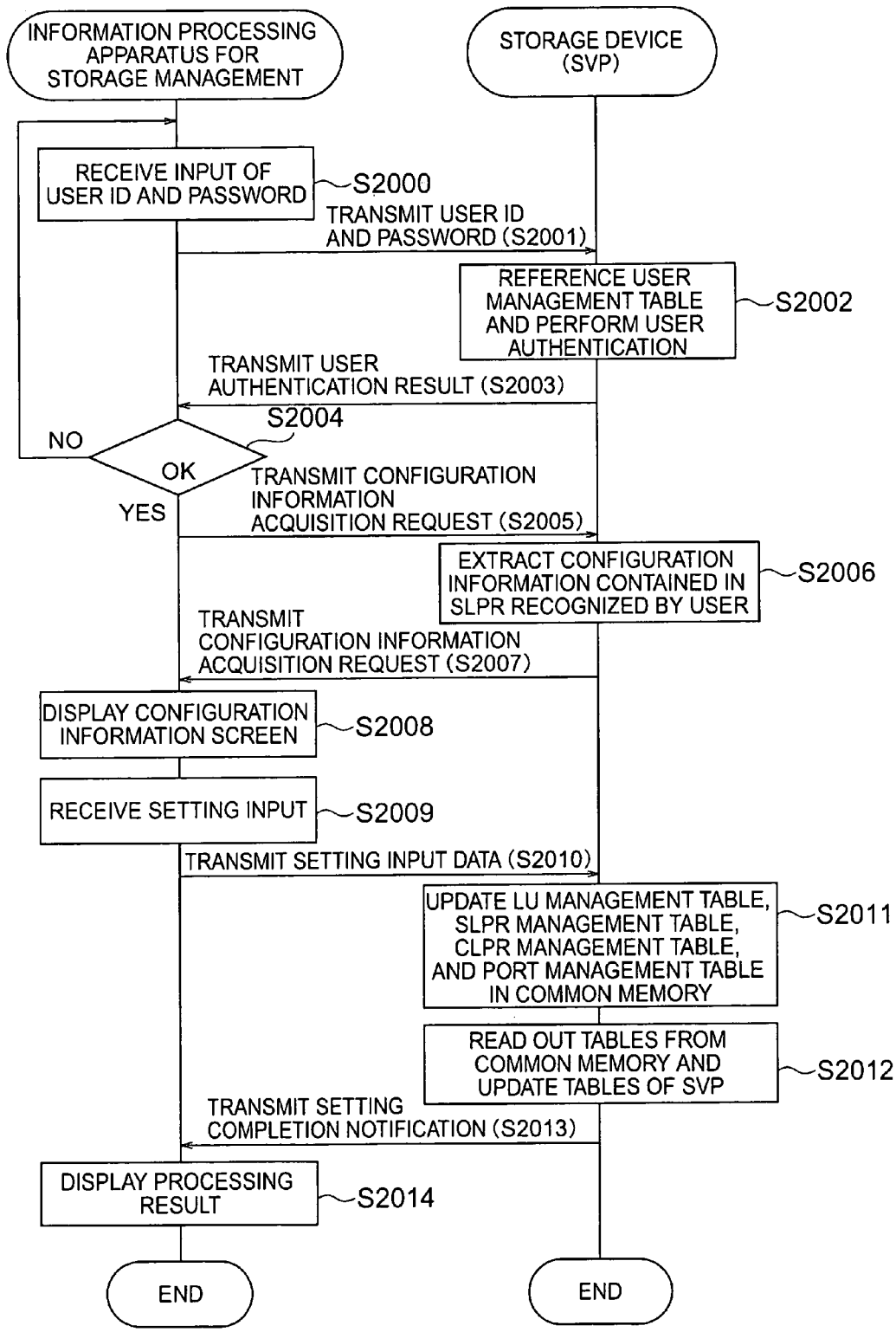
FIG. 22 is a flowchart showing a processing flow when displaying the storage resources allocated to each user according to the present embodiment.

Next, explanation will be given on a processing flow when the storage administrator (partition storage administrator) of each user performs setting of the storage system 600 within the range of the storage resources of the storage system 600 thus allocated to each user, with reference to a flowchart of FIG. 22. It should be noted that the processing described below is realized by the CPU 210 of the information processing apparatus 200 and the CPU 161 of the management terminal 160 which execute the management program 220B composed of codes for performing various operations stored in the memory 220 and the storage management program 162C composed of codes for performing various operations stored in the memory 162, respectively.

Firstly, the information processing apparatus 200 for user management receives the user ID and the password from the user interface (S2000). Then, the information processing apparatus 200 for user management transmits the user ID and the password via the LAN 400 to the management terminal 160 (S2001). The management terminal 160 refers to the user management table 162D stored in the memory 162 and performs user authentication (S1002).

The management terminal 160 refers to the user management table 162D to check the user ID and the password transmitted from the information processing apparatus 200 for user management, thereby performing authentication of the partitioned storage administrator. Thus, by performing authentication of the partitioned storage administrator, it is possible to prevent modification of configuration of the storage system 600 by an unauthorized third person who pretends to be the partitioned storage administrator.

The management terminal 160 transmits the authentication result to the information processing apparatus 200 for user management (S2003). When the information processing apparatus 200 for user management is authorized as the partitioned storage administrator from the management terminal 160, control is passed to "Yes" in S2004 and a configuration information acquisition request (request for transmitting storage resource management information) is transmitted to the management terminal 160 (S2005). The configuration information acquisition request is a command for acquiring information on management of the storage resources allocated to each user. Upon reception of the configuration information acquisition request, the management terminal 160 refers to the user-SLPR relation table 162E, LU management table 162B, the SLPR management table 162F, the CLPR management table 162G, and the port management table 162H stored in the memory 162, extracts storage resource allocation information including the identifier of the communication port allocated for the user, the identifier of the physical disk drive 330, and the storage capacity of the cache memory 130 (S2006), and transmits the information to the information processing apparatus 200 for user management (S2007).

Next, the information processing apparatus 200 for user management displays a configuration information screen on the user interface (S2008). The display of the configuration information screen may also be performed by displaying the Web page transmitted from the management terminal, for example.

FIG. 23 shows an example of the configuration information screen. FIG. 23 shows a case that information on allocation of the storage resource of the SLPR0 allocated for user_A is displayed. As shown in FIG. 23, the partitioned storage administrator can refer to and update the information on the allocation of the storage resource allocated for him/her among the storage resources of the storage system 600. On the configuration information screen, information on the allocation of the storage resources not allocated to him/her is not displayed. According to the storage resource allocation information displayed on the configuration information screen, the partitioned storage administrator can set the SLPR and the CLPR allocated to his/her company. Moreover, these information items are acquired by the management program 220B and the partitioned storage administrator can perform various settings such as setting of the logical volume 310 for the physical disk drive 330, setting of a logical volume which can be accessed from the information processing apparatus 200 of his/her company, and setting of the path which is the communication path from the information processing apparatus 200 of his/her company to the storage control apparatus 100 within the range of storage resources allocated for his/her company. When the "OK" column in the configuration information screen is clicked by superimposing the cursor of a mouse, the content input by the partitioned storage administrator is accepted by the information processing apparatus 200 for the user management (S2009). The information processing apparatus 200 for user management transmits the content to the management terminal 160 (S2010).

Then, the management terminal 160 updates the contents of the LU management table 162B, the SLPR management table 162F, the CLPR management table 162G, and the port management table 162H (S2011). The management terminal 160 reads out the LU management table 162B, the SLPR management table 162F, the CLPR management table 162G, and the port management table 162H from the common memory 120 and updates the contents of the memory 162 of the management terminal 160 (S2012). After this, the management terminal 160 transmits the setting end notification to the information processing apparatus 200 for user management (S2013). The information processing apparatus 200 for user management displays the setting contents on the user interface (S2014). By the aforementioned processing, the partitioned storage administrator can set the storage resources within the storage resources of the storage system 600 allocated for him/her. It should be noted that here explanation has been given of a case that setting is performed by using the information processing apparatus 200 for user management, but it is also possible to perform the setting from the management terminal without using the information processing apparatus 200 for user management.

As has been explained above, in the storage system including the storage control apparatus 100 according to the present embodiment, only the information on management of the storage resource allocated to each user can be transmitted to each user. Thus, each user can perform various settings with respect to the storage resource allocated to him/her independently of the storage resources allocated to the other users. Accordingly, for example, it is possible to prevent affect to storage resources of the other users even if erroneous setting is performed with respect to the storage resource of each user. Moreover, for example, between the companies using the storage system 600, it is possible to prevent leak of secrets of a company to the other companies.

Moreover, each user sharing the storage system 600 can use the cache memory 130 allocated to him/her without being affected by the use of the storage system 600 by the other users. Accordingly, in the storage system 600 according to the present embodiment, even when the storage system 600 is shared by a plurality of users, the cache hit ratio of each user is not affected by the use of the storage system 600 by the other users. Consequently, it is possible to realize storage consolidation capable of providing storage resources independently without dependency between users. That is, even when operating the storage system 600 in the form of storage consolidation, each information processing apparatus 200 can perform data I/O processing without being affected by performance deterioration due to data I/O processing performed by the other information processing apparatus 200.

Thus, in the storage system 600 including the storage control apparatus 100 according to the present embodiment, the respective users of the information processing apparatuses 200 can perform data I/O processing as if they were using the dedicated storage system 600 in spite of that they are using the common storage system 600.

Furthermore, it is possible to simplify the system management when performing the storage consolidation and reduce the system management cost.

The best mode for carrying out the invention has been explained. The aforementioned embodiment is for facilitating understanding of the present invention and not for limiting the interpretation of the present invention. The present invention can be modified and improved without departing from the spirit of the invention and includes equivalence of the invention.

What is claimed is:

1. A storage control apparatus comprising:
   a data I/O control section, which has a plurality of communication ports each of which is connectable with any of a plurality of information processing apparatuses, is communicatively connected to a plurality of physical disk drives for storing data, receives a data I/O request for data stored in the physical disk drives from the information processing apparatuses via the communication ports, and performs data read/write from/to the physical disk drives in accordance with the received data I/O request;

a cache memory;

storage resources which are partitioned into a plurality of storage resource groups each having one or more communication ports, storage capacity in said cache memory and one or more physical disk drives, wherein each storage resource group is assigned to an user, wherein said user is permitted to set a configuration of said one or more communication ports, said storage capacity in said cache memory and said one or more physical disk drives of said storage resource group assigned to said user; and a second memory which stores information on management of said storage resources including said storage resource groups each being assigned to a user and having said one or more communication ports, said storage capacity in said cache memory, and said one or more physical disk drives, wherein in response to reception of a transmission request of the information on management of a first storage resources group from a first user via a user interface, the storage control apparatus transmits an identifier of the one or more communication ports, an identifier of the one or more physical disk drives, and a storage capacity of the cache memory in the first storage resource group assigned to said first user.

2. A storage control apparatus as claimed in claim 1, wherein said information on management of the storage resources includes:

information representing a first relationship between the one or more physical disk drives of each storage resource group and a data amount which can be stored in the cache memory among the data stored in the one or more physical disk drives, and information representing a second relationship between the first relationship and the one or more communication ports of each storage resource group.

3. A storage control apparatus as claimed in claim 1, wherein said one or more physical disk drives of each storage resource group include of a plurality of hard disk drives constituting an Redundant Array of Inexpensive Disk (RAID).

4. A storage control apparatus according to claim 3, wherein said data I/O control section comprises:

a channel control section, which has a plurality of communication ports each of which is connectable with one of a plurality of information processing apparatuses and receives a data I/O request for data stored in physical disk drives including a plurality of hard disk drives constituting a Redundant Array Inexpensive Disk (RAID); and a disk control section which is communicatively connected to the physical disk drives and performs data read/write from/to the physical disk drives according to the data I/O request.

5. A storage control apparatus according to claim 1, wherein said data I/O control section comprises:

a channel control section, which has a plurality of communication ports each of which is connectable with one of a plurality of information processing apparatuses and receives a data I/O request for data stored in physical disk drives including a plurality of hard disk drives constituting a Redundant Array Inexpensive Disk (RAID); and a disk control section which is communicatively connected to the physical disk drives and performs data read/write from/to the physical disk drives according to the data I/O requests.

6. A storage control apparatus according to claim 1, wherein a number of data blocks allocated to the storage capacity in said cache memory of each storage resource group is increased or decreased as needed to provide a set storage capacity of the cache memory to each user so as to be affected by the cache memory by the other users.

7. A method for controlling a storage control apparatus comprising a data I/O control section, which has a plurality of communication ports each of which is connectable with one of a plurality of information processing apparatuses, is communicatively connected to a plurality of physical disk drives for storing data, receives a data I/O request for data stored in the physical disk drives from the information processing apparatuses via the communication ports, and performs data read/write from/to the physical disk drives in accordance with the received data I/O request; a cache memory; and a second memory; said method comprising the steps of:

receiving a transmission request of information on management of a first storage resource group of storage resources from a first user via a user interface, wherein said storage resources are partitioned into a plurality of storage resource groups each having one or more communication ports, storage capacity in said cache memory and one or more physical disk drives, wherein each storage resource group is assigned to a user, wherein said user is permitted to set a configuration of said one or more communication ports, said storage capacity in said cache memory and said one or more physical disk drives of said storage resource group assigned to said user, wherein the second memory stores information on management of said storage resources including said storage resource groups each being assigned to a user and having said one or more communication ports, said storage capacity in said cache memory, and said one or more physical disk drives; and in response to reception of the transmission reguest of the information on management of the first storage resource group from the first user via the user interface, transmitting an identifier of the one or more communication ports, an identifier of the one or more physical disk drives, and a storage capacity of the cache memory in the first storage resource group assigned to said first user.

8. A method for controlling a storage control apparatus as claimed in claim 7, wherein said information on management of the storage resources includes information representing a first relationship between the one or more physical disk drives of each storage resource group and a data amount which can be stored in the cache memory among the data stored in the one or more physical disk drives, and information representing a second relationship between the first relationship and the one ore more communication port.

9. A method for controlling a storage control apparatus as claimed in claim 7, wherein said one or more physical disk drives of each storage resource group include a plurality of hard disk drives constituting an Redundant Array of Inexpensive Disk (RAID).

10. A storage control apparatus according to claim 2, wherein said data I/O control section comprises:
- a channel control section, which has a plurality of communication ports each of which is connectable with one of a plurality of information processing apparatuses and receives a data I/O request for data stored in physical disk drives including a plurality of hard disk drives constituting a Redundant Array Inexpensive Disk (RAID); and
- a disk control section which is communicatively connected to the physical disk drives and performs data read/write from/to the physical disk drives according to the data I/O request.

11. A method for controlling a storage control apparatus according to claim 7, wherein a number of data blocks allocated to the storage capacity in said cache memory of each storage resource group is increased or decreased as needed to provide a set storage capacity of the cache memory to each user so as not to be affected by use of the cache memory by the other users.

* * * * *